Oct. 26, 1971
T. O. PAINE
ADMINISTRATOR OF THE NATIONAL AERONAUTICS
AND SPACE ADMINISTRATION
POSITIONING MECHANISM
3,614,898
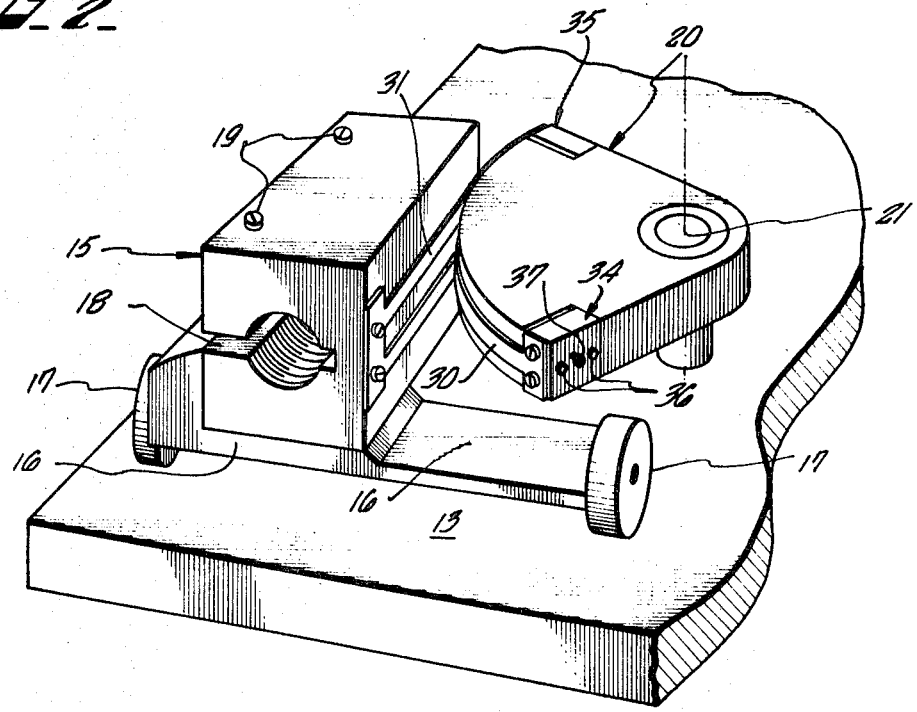
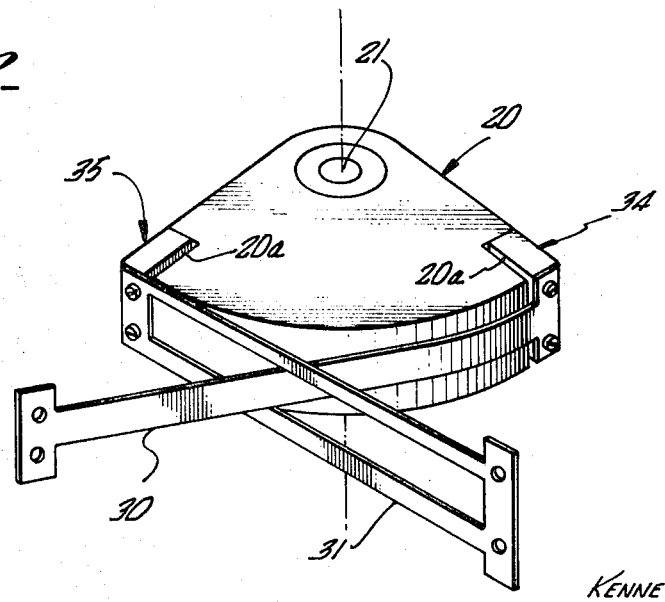
INVENTOR.
KENNETH G. JOHNSON
BY
ATTORNEY

United States Patent Office 3,614,898
Patented Oct. 26, 1971

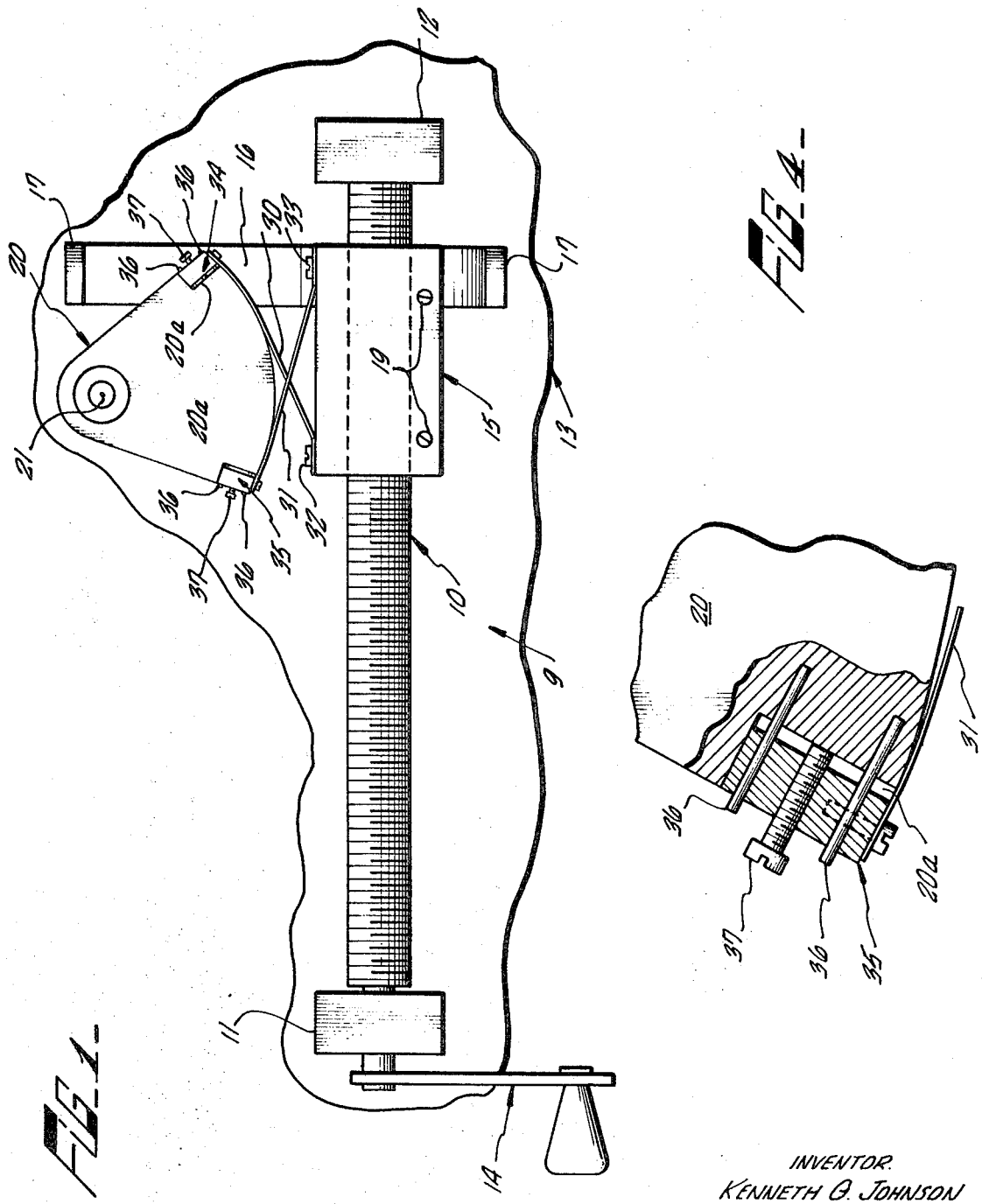

3,614,898
POSITIONING MECHANISM
T. O. Paine, Administrator of the National Aeronautics and Space Administration, with respect to an invention of Kenneth G. Johnson, Los Angeles, Calif.
Filed Aug. 7, 1969, Ser. No. 848,282
Int. Cl. F16h 27/02
U.S. Cl. 74—89.15                                   4 Claims

ABSTRACT OF THE DISCLOSURE

The disclosure describes a positioning mechanism for converting translatory motion into rotary motion, and is especially adapted for precision instrumentation. The mechanism includes a lead screw having a carriage threadedly mounted thereon and a sector pivotally mounted about a fixed axis normal to that of the lead screw and connected to the carriage by means of a pair of flexible bands. The sector is also provided with adjustment means for maintaining each of the bands in a taut condition between the carriage and the sector. Upon translatory movement of the carriage by rotation of the lead screw, the sector is drawn about its pivot by the carriage via the bands.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

(1) Field of the invention

This invention relates to kinetic mechanisms for converting translatory motion into rotary motion and more particularly to positioning mechanisms suitable for use with precision instrumentation.

(2) Description of the prior art

In the prior art there are many modes of converting translatory motion into rotary motion, however, very few of these modes are suitably adapted for precision instrumentation.

A common mechanism for converting translatory motion into rotary motion is a rack and pinion device wherein the rack moves longitudinally along the track and engages the pinion which is mounted about a fixed axis normal to the movement of the rack. Upon such longitudinal movement of the rack, the teeth of the rack engage the gear teeth of the pinion to rotate the pinion about its axis. Because of the large tolerances involved in manufacturing these gears and because of the large amount of play and gear backlash in the inter-engagement of these members, these devices are totally unsuitable for precision instrumentation.

The most common positioning mechanisms utilize lead screws because such screws can be manufactured with a very high degree of precision and there is a minimum of lead error involved between the engaged members. In such mechanisms the lead screw usually has a carriage threadedly mounted thereon. The carriage is coupled to a rotary member which is mounted about a fixed axis normal to the axis of the lead screw, whereby, upon rotation of the lead screw, the carriage moves in a longitudinal direction along the axis of the lead screw, and draws the rotary member about its axis by means of the coupling means. Although the lead screw can operate at minute tolerances, the main problem encountered by such devices is in maintaining these tolerances in transferring the linear motion of the carriage to the rotary motion of the rotating member. In such devices a great deal of the tolerances is lost because of the inaccuracies of the coupling means.

In some mechanisms the coupling means is a connecting arm which pivots about the fixed axis and is also pivotally connected to the carriage. Since all of the structures are rigid members, very little lost motion results. However, because of such rigid confinement, the device is severely limited in the amount of travel of the carriage and the angular rotation of the arm, thereby making its utilization impractical in most precision instrumentation.

Other coupling means utilized in such mechanisms include flexible members for coupling the carriage to the rotary member. However, because of the flexibility of the coupling member, the devices usually work well in one direction only, while in the other direction, because of the coupling's flexibility, unwanted flexing and twisting occurs which results in lost motion. Furthermore, such coupling members are usually not maintained in a taut position between the carriage and the rotary member, which also results in a great deal of play and lost motion therebetween.

OBJECTS AND SUMMARY OF THE INVENTION

The invention obviates the above-mentioned shortcomings by providing a positioning mechanism that is accurately operable in both directions. The mechanism includes a lead screw having a carriage threadedly mounted thereon. A sector is pivotally connected about a fixed axis normal to the axis of the lead screw and is connected to the carriage by means of a pair of flexible bands. Each of the bands is connected on one end to the carriage and at the other end to the peripheral portion of the sector with the bands intersecting one another therebetween to form a figure X. Upon translatory movement of the carriage, the carriage draws with it the bands which in turn draws the sector about its pivot. Because the bands are positioned such that at least one is under tension at all times, the sector can be rotated in either direction of rotation without any lost motion or play. The sector is also provided with adjusment means for maintaining each of the bands in a taut position, further preventing any lost motion from occurring.

The invention thus fulfills the primary object by providing an extremely accurate positioning mechanism suitable for use with precise instrumentation.

Another object of the invention is to provide a positioning mechanism having coupling means that maintains the accuracy of the lead screw in transferring the translatory motion of the lead screw to the rotary member.

Still another object of the invention is to provide a positioning mechanism that is simple in design and quite easy to fabricate.

The features of the present invention which are believed to be novel are set forth with particularity in the appended claims. The present invention, both as to its organization and manner of operation, together with further objects and advantages thereof, may best be understood by reference to the following description, taken in connection with the accompanying drawigs.

BRIEF DESCRIPTION OF THE DRAWINGS

FIG. 1 is a top plan view of the positioning mechanism in accordance with the present invention;

FIG. 2 is a perspective view of the carriage and sector;

FIG. 3 is an enlarged perspective view of the sector and the flexible bands connected thereto; and FIG. 4 is an enlarged fragmentary view partly in section of the adjustment means on the sector.

DESCRIPTION OF THE PREFERRED EMBODIMENT

Referring to the drawings, FIG. 1 shows a positioning mechanism, generally indicated by arrow 9, having a precision ground lead screw 10 which is journaled at its ends in supports 11 and 12 mounted on a base 13. A handle 14 is fixedly connected to the one end of the lead screw 10 to provide the drive means for rotatably driving the lead screw 10. It is noted that other conventional drive means may also be utilized in rotating the lead screw 10.

A precision ground and lapped carriage 15 is threadedly mounted on the lead screw 10 and is adapted to move longitudinally along the axis of the lead screw 10 upon rotation thereof. The carriage 15 is also supported by a roller support 16 having a pair of rollers 17 attached to its extremities. The rollers 17 bear upon the flat surface of the base 13 and function to prevent the carriage 15 from rotating with the lead screw 10 when the latter is rotated.

As shown in FIG. 2, the carriage 15 forms a slot 18 extending through its one side thereof into the interior of the carriage 15. A pair of adjusting screws 19 also extend through the carriage 15 and across the slot 18 to provide means for adjusting the clearance of the slot 18 which, in turn, varies the fit of the threads of the carriage 15 and the lead screw 10.

Referring now to FIGS. 1-3 together, a sector 20 is pivotally mounted for rotation in a horizontal plane about a vertical axis, or pivot, 21. The sector 20 and the carriage 15 are coupled together by a pair of flexible bands 30 and 31, which are fashioned of a suitable resilient material, such as Phosphor bronze. The band 30 comprises a single elongated strip having a pair of enlarged ends, one end of which is connected to the carriage 15 by a pair of screws 32. The band 31 includes a pair of elongated strips which intersect the band 30 on both sides thereof, with the strips also terminating in a pair of enlarged ends, one end of which is connected to the carriage 15 by a pair of screws 33. The other ends of the bands 30 and 31 are attached to blocks 34 and 35, respectively, which are mounted within a pair of notches 20A formed at the corners of the sector 20. The blocks 34 and 35 are provided to attach the bands 30 and 31 to the sector 20 and furthermore function as adjustment means for taking up any slack in the bands 30 and 31 and maintaining them in a taut condition between the carriage 15 and the sector 20. The periphery of the sector 20 is formed to engage a portion of the bands 30 and 31 with the amount of engagement varying with the angular rotation of the sector 20. This arcuate section also serves to maintain the bands in a taut condition. It should be noted that the distance between the carriage 15 and the sector 20 is exaggerated for illustrative purposes only. In actuality the distance therebetween should equal the width of the bands 30 and 31.

Referring now to FIG. 4, which shows an enlarged view of the block 35, a pair of dowel pins 36 is anchored at their bases to the sector 20 and extend into a pair of holes formed within the block 35. An adjusting screw 37 also extends through a threaded bore formed within the block 35 to engage the surface of the notch 20A. The adjusting screw 37 varies the position of the block 35 with respect to the notch 20A, thereby functioning to maintain the bands 30 and 31 in a taut condition between the carriage 15 and the sector 20.

OPERATION

As can be seen, the bands 30 and 31 intersect each other to form a figure X with the bottom pair of legs engaging the carriage 15 and the top pair of legs engaging the sector 20. These bands 30 and 31 are maintained in a taut condition between the sector 20 and the carriage 15 by turning the adjusting screws 37 on the blocks 34 and 35. Thereafter, upon rotation of the lead screw 10 by means of a handle 14, or other motive means, the carriage moves longitudinally along the length of the lead screw 10. Such movement is then transferred through the bands 30 and 31 to rotate the sector 20 about its axis 21.

Because of the novel X-shaped configuration of the bands, and the adjustment means therewith, the bands 30 and 31 are always maintained in a taut condition in both directions of the carriage travel. As a result the positioning mechanism 9 is operable in both directions of movement without any lost motion or play therebetween. Since the carriage is accurately fitted to the lead screw and since the precision ground lead screw has a minimum of lead error, it is apparent that the uniform linear translation induced by the rotation of the lead screw 10 will result in a uniform angular rotation of the sector 20 about its pivot 21 without any loss in accuracy due to the coupling means. As a result anything mounted on the sector member will have the same uniform travel.

What is claimed is:

1. A positioning mechanism comprising: a lead screw rotatable about a fixed axis; a carriage threadedly mounted on said lead screw and axially movable with respect to said lead screw upon rotation thereof; a sector pivotally mounted about an axis normal to the axis of said lead screw; and a flexible coupling comprising a pair of elongated flexible bands intersecting each other to form a figure X, each band having one end connected to said carriage and the other end connected to said sector, said flexible bands being maintained in a taut condition between said sector and said carriage by adjusting means whereby upon movement of said carriage in either axial direction, said sector will be drawn about its axis by the coupling means without any lost motion therebetween; said sector includes an arcuate surface and each band is connected to a respective corner of said sector at the ends of the arcuate surface and is adapted to extend onto the arcuate surface of said sector during rotation thereof; said corners are movable to draw the other end of said band away from the one end thereof to maintain the band in a taut position between said carriage and said sector.

2. A positioning mechanism comprising: a lead screw rotatable about a fixed axis; a carriage threadedly mounted on said lead screw and axially movable with respect to said lead screw upon rotation thereof; a sector pivotally mounted about an axis normal to the axis of said lead screw; and a flexible coupling comprising a pair of elongated flexible bands intersecting each other to form a figure X, each band having one end connected to said carriage and the other end connected to said sector, said flexible bands being maintained in a taut condition between said sector and said carriage by adjusting means whereby upon movement of said carriage in either axial direction, said sector will be drawn about its axis by the coupling means without any lost motion therebetween; said movable block is axially slidable on a pair of dowel pins extending from said sector, each of said movable blocks further including an adjusting screw for adjusting the position of said block with respect to said sector.

3. A positioning mechanism comprising:
a lead screw rotatable about a fixed axis;
a carriage threadedly mounted on said lead screw and axially movable with respect to said lead screw upon rotation thereof;
a sector pivotally mounted about an axis normal to the axis of said lead screw;
a flexible coupling means connecting said sector to said carriage, said coupling means being maintained in a taut condition between said sector and said carriage whereby upon movement of said carriage in either axial direction, said sector will be drawn about its axis by the coupling means without any lost motion therebetween; and
means for preventing said carriage from rotating upon rotation of said lead screw, said antirotation means comprising a roller support connected to said carriage, said roller support having rollers connected thereto which are adapted to bear on a flat surface of a base supporting said positioning mechanism.

4. A positioning mechanism comprising:

a lead screw rotatable about a fixed axis;

a carriage threadedly mounted on said lead screw and axially movable with respect to said lead screw upon rotation thereof;

a sector pivotally mounted about an axis normal to the axis of said lead screw; and a flexible coupling comprising a pair of elongated flexible bands intersecting each other to form a figure X, each band having one end connected to said carriage and the other end connected to said sector, said flexible bands being maintained in a taut condition between said sector and said carriage by adjusting means whereby upon movement of said carriage in either axial direction, said sector will be drawn about its axis by the coupling means without any lost motion therebetween; said adjustment means include a pair of blocks on said sector supporting the other ends of said bands, said blocks being movable to draw the other ends of said bands away from the one end thereof.

References Cited

UNITED STATES PATENTS

| | | | |
|---|---|---|---|
| 2,706,913 | 4/1955 | Trossi | 74—89.2 |
| 2,947,185 | 8/1960 | Ziegler | 74—89.2 |
| 240,508 | 4/1881 | Curtice | 74—89.2 |

FOREIGN PATENTS

| | | | |
|---|---|---|---|
| 24,994 | 4/1964 | Germany | 74—89.15 |

WILLIAM F. O'DEA, Primary Examiner

W. S. RATLIFF, Jr., Assistant Examiner

U.S. Cl. X.R.

74—89.2